United States Patent
Linnér

(10) Patent No.: US 7,021,032 B2
(45) Date of Patent: Apr. 4, 2006

(54) TUBE-FILLING MACHINE AND A METHOD FOR TUBE END SEALING IN SUCH A MACHINE

(75) Inventor: Hans Linnér, Kalmar (SE)

(73) Assignee: Norden Pac Development AB, (SE)

( * ) Notice: Subject to any disclaimer, the term of this patent is extended or adjusted under 35 U.S.C. 154(b) by 0 days.

(21) Appl. No.: 10/498,148

(22) PCT Filed: Nov. 19, 2002

(86) PCT No.: PCT/SE02/02097

§ 371 (c)(1),
(2), (4) Date: Oct. 22, 2004

(87) PCT Pub. No.: WO03/055748

PCT Pub. Date: Jul. 10, 2003

(65) Prior Publication Data

US 2005/0061392 A1    Mar. 24, 2005

(30) Foreign Application Priority Data

Dec. 11, 2001 (SE) .................................. 0104166

(51) Int. Cl.
*B65B 51/20* (2006.01)

(52) U.S. Cl. .................. 53/479; 53/373.9; 493/191

(58) Field of Classification Search ............. 53/370.9, 53/373.9; 493/191, 192
See application file for complete search history.

(56) References Cited

U.S. PATENT DOCUMENTS

| | | | |
|---|---|---|---|
| 4,035,926 A | | 7/1977 | Farfaglia |
| 4,511,426 A | * | 4/1985 | Linner ..................... 156/497 |
| 5,323,589 A | * | 6/1994 | Linner ..................... 53/432 |
| 5,714,023 A | * | 2/1998 | Redfern ..................... 156/69 |
| 5,775,386 A | * | 7/1998 | Connan ..................... 141/103 |
| 6,574,946 B1 | * | 6/2003 | Linner ..................... 53/479 |

FOREIGN PATENT DOCUMENTS

| | | |
|---|---|---|
| EP | 0 667 285 A1 | 8/1995 |
| GB | 2 248 820 A1 | 4/1992 |
| WO | WO-99/29572 A1 | 6/1999 |

* cited by examiner

*Primary Examiner*—John Sipos
(74) *Attorney, Agent, or Firm*—Lerner, David, Littenberg, Krumholz & Mentlik, LLP

(57) ABSTRACT

The invention provides tube-filling machines and methods for, in such machines, end sealing of double tubes (10), that is to say the tube type which has concentric packing tubes (11, 12) which are connected to a common tube shoulder (13) provided with a dispensing opening. The invention provides a two-part hot-gas nozzle (22) with individual supply of hot gas to the inner side of the inner tube and the outer tube for thermal activation of the scaling end of the double tube intended for heat sealing.

5 Claims, 4 Drawing Sheets

A—A

B—B

TUBE-FILLING MACHINE AND A METHOD FOR TUBE END SEALING IN SUCH A MACHINE

This application is a national stage entry of PCT/SE02/02097 with International Filing Date of Nov. 19, 2002.

The invention relates to tube-filling machines and a method for tube end sealing in such machines. More precisely, the invention relates to processing of double tubes. This means a tube of the kind which has an inner tube and, surrounding this with a gap, an outer tube, both connected to a common tube shoulder which has means for delivering product from the inner tube and the outer tube through an emptying opening in a desired way.

STATE OF THE ART

Double tubes of said kind and also other types of two-chamber or multi-chamber tubes are used for inter alia packing different types of products or components which, on mutual contact, react easily with one another chemically or in another way. It is desirable that such reaction occurs only in connection with the contents, in portions or completely, being emptied from the tube. Under such conditions, the components therefore have to be stored separately in the tube.

Applications other than that mentioned also exist. A double tube or other multi-chamber tube can be used, for example, to deliver "striped toothpaste".

For rapid and reliable processing of said double tubes, however, an effective tube end-sealing step and thus a commercially competitive tube-filling machine are lacking at present.

Such a tube-filling machine is to be capable of being used, with precision and high capacity, for producing defect-free, filled tubes without operational stoppages of the machine as a consequence of, for example, contamination in connection with filling, poor sealing of filled tubes or other hitches which disrupt functioning.

In order to achieve high output capacity, it is also to be possible when necessary for the processing in the machine to carry out the tube end sealing in a parallel manner with a large number of tubes simultaneously in the sealing station.

THE OBJECT OF THE INVENTION

Double tubes of the kind mentioned in the introduction have previously caused major problems, and it has not been possible effectively to seal the ends of such tubes in tube-filling machines without encountering the disruptions mentioned above.

The object of the invention is therefore to eliminate this disadvantage and to provide effective processes and a tube-filling machine for the double tubes.

THE INVENTION

The object of the invention is achieved by the sealing methods according to the method claim 1 and also by the tube-filling machines according to the machine claim 3.

Dependent claims linked to the respective main patent claims indicate advantageous developments.

DESCRIPTION OF THE DRAWINGS

The accompanying drawings show in a number of basic and detailed illustrations major structural elements forming part of the tube-filling machine for realization of the above-mentioned object, in which drawings.

PREFERRED EMBODIMENT OF THE INVENTION

Figure 1:
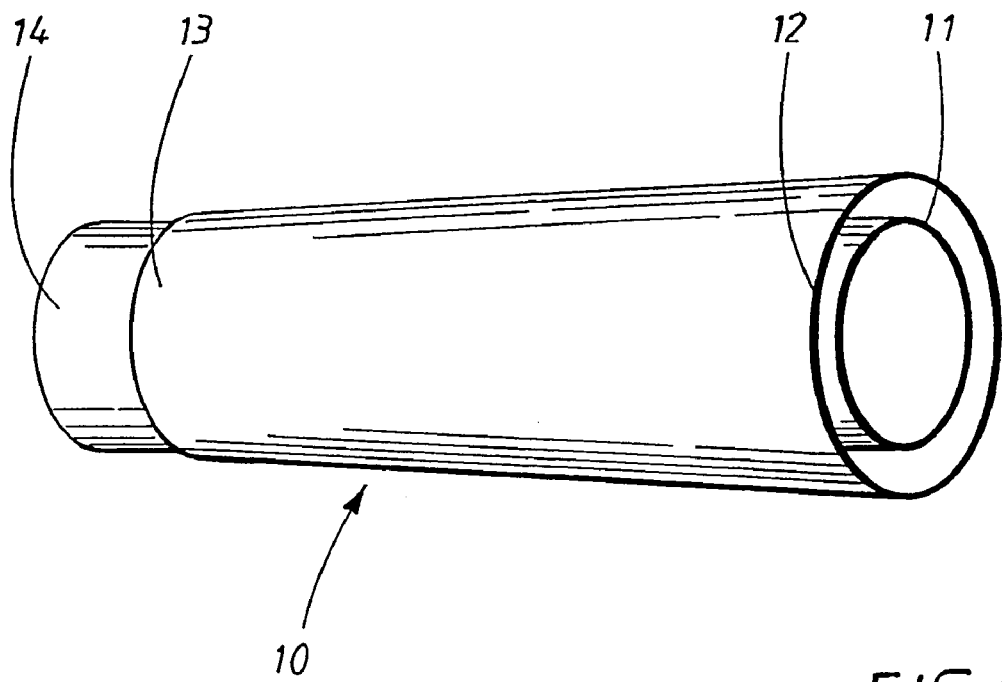
FIG. 1 shows a double tube in principle in its state before insertion into the tube-filling machine according to the invention.

The double tube 10 in FIG. 1 has an inner tube 11 and an outer tube 12. These two tubes are connected to a tube shoulder 13, in which there are passages (not shown) for separate dispensing and subsequent mixing of the contents of the inner tube 11 and the gap-shaped space between the inner tube and the outer tube. There is a tube cap 14 on the tube shoulder.

In the embodiment shown, the inner tube, the outer tube, the tube shoulder and the tube cap all have a circular cross section, which is to be preferred with the tube end sealing step which will be described below.

In principle, however, other cross-sectional shapes are possible.

The selection of material for the double tube components depends on the intended application. Thermoplastics of the polyolefin type, for example polyethylene, polypropylene etc. with or without barrier layer, are usually used. In order to apply the hot-gas activation technique and heat-sealing method which will be described below, however, it is essential that the open end portions of the double tube in FIG. 1 comprise material which is heat-sealable.

The double tube 10 is inserted into the tube-filling machine directly from transport packs filled with a large number of tubes and supplied by a tube manufacturer. The tubes can be greatly deformed and deviate considerably from their nominal (circular) cross section at the open end. The double tube shown in FIG. 1 intended for insertion into the tube-filling machine deviates moderately from the nominal cross section. In view of the fact, however, that the gap between the inner tube and the outer tube has a relatively small width, for example of the order of 5 mm, handling is inevitably a delicate operation, in connection with filling the gap space as disclosed in one co-pending Swedish patent application No 0104166-4, but also during thermal activation for subsequent sealing.

Figure 2:
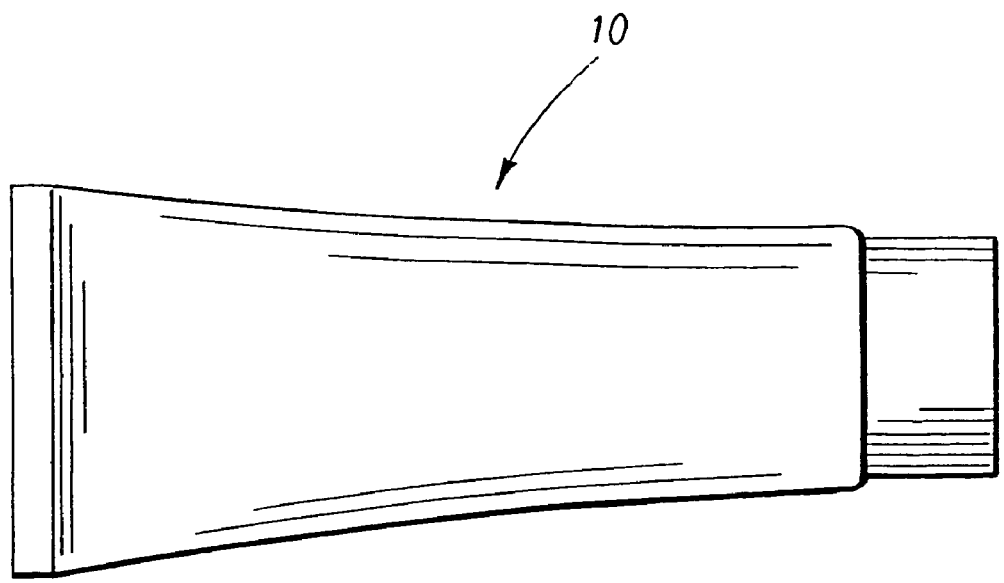
FIG. 2 shows the double tube in FIG. 1 in its state when it leaves the tube-filling machine.

It is an important task, with the narrow gap space and where appropriate different kinds of material in the inner tube and the outer tube, to bring about leakproof and aesthetically attractive end sealing of the double tube. Such end sealing can be seen in FIG. 2. The invention provides a special thermal activation process for this important task.

In a station in the tube-filling machine according to the invention, the open end portion of the double tube 10 is to be thermally activated, then to be heat-sealed by clamping jaws, which are preferably cooled, in a subsequent work station.

Figure 3:
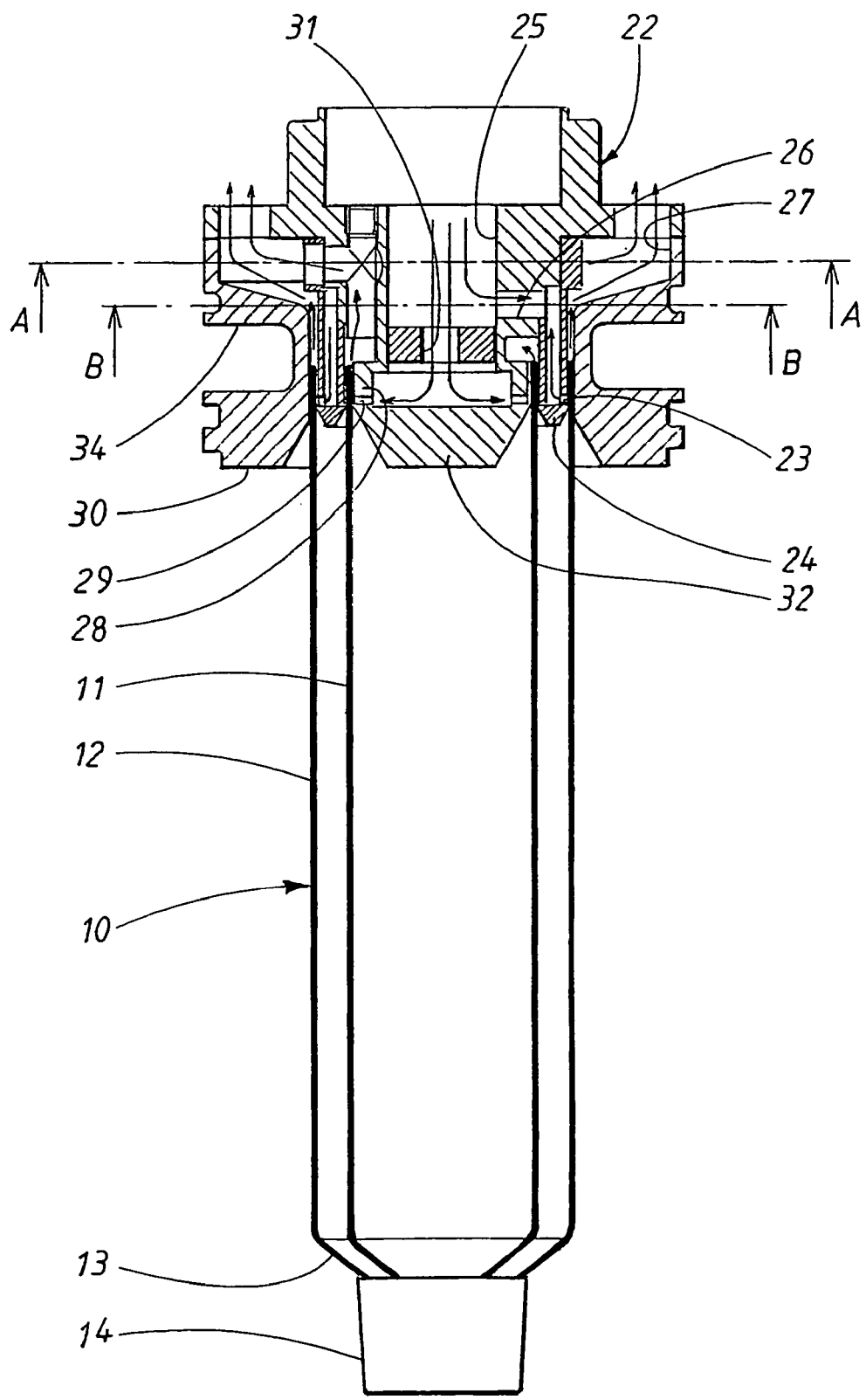
FIG. 3 shows a basic diagram of the hot-gas nozzle for thermal activation of the heat-sealable end portions of the inner and outer tubes intended for end sealing.

FIG. 3 shows in principle the way in which a hot-gas nozzle, preferably a hot-air nozzle, according to a preferred embodiment of the invention is designed.

The hot-air nozzle 22 comprises an outer annular part 24 provided with outlet openings 23 and intended to be inserted with play into the open end of the gap-shaped space filled with product, without touching the product. A supply duct 25 conducts hot air to the annular part 24 via a separate passage 26 for this annular part.

From the outlet openings 23, hot air flows against the inner side of the end of the outer tube 12, thermally activates the tube material there and is conducted off via an outflow duct 27.

The hot-air nozzle 22 also has a second part 28, which is essentially circular-cylindrical, provided with outlet openings 29 and dimensioned to be inserted with play into the open end of the inner tube 11 filled with product, but without touching the product. Said second part 28 of the hot-air nozzle is fed with hot air from the same supply duct 25 as the part 24, but has a separate (individual) passage 31 for supply of hot air to the outlet openings 29.

After the hot air has left said openings 29, it is applied to the inner side of the end of the inner tube filled with product in order to activate thermally the heat-sealable material of the end portion for the purpose of end-sealing the double tube in a following work station working with clamping jaws.

After this thermal activation, the air from the outlet openings 29 is collected together in the same outflow duct 27 as the air from the outlet openings 23 in the annular part of the hot-air nozzle 22.

Arranged peripherally around the annular part 24 of the hot-air nozzle is a centring sleeve 30 with a gap forming a clearance between the centring sleeve and the annular part 24 dimensioned to receive the open end of the outer tube. The centring sleeve 30 shapes the tube end to and maintains it at nominal cross-sectional dimension and centres the outer tube relative to the hot-air nozzle and thus the whole double tube 10.

As mentioned previously, the tube materials of the inner tube and the outer tube may be different and thus not have the same thermal activation characteristics. The individual (separate) passages 26 and 31 can be adapted in order by empirical trials to overcome any problem caused by different kinds of material.

The centring sleeve 30 has an all-round recess 34 intended to form a part wall for a cooling duct for cooling the centring sleeve, for example with water, and thus regulating the temperature of the outer side of the outer tube. In combination with the individual passages for supplying hot air, this affords excellent possibilities for setting the correct thermal activation temperature for bringing about aesthetically attractive and acceptable end-sealing of the double tube.

Figure 4:
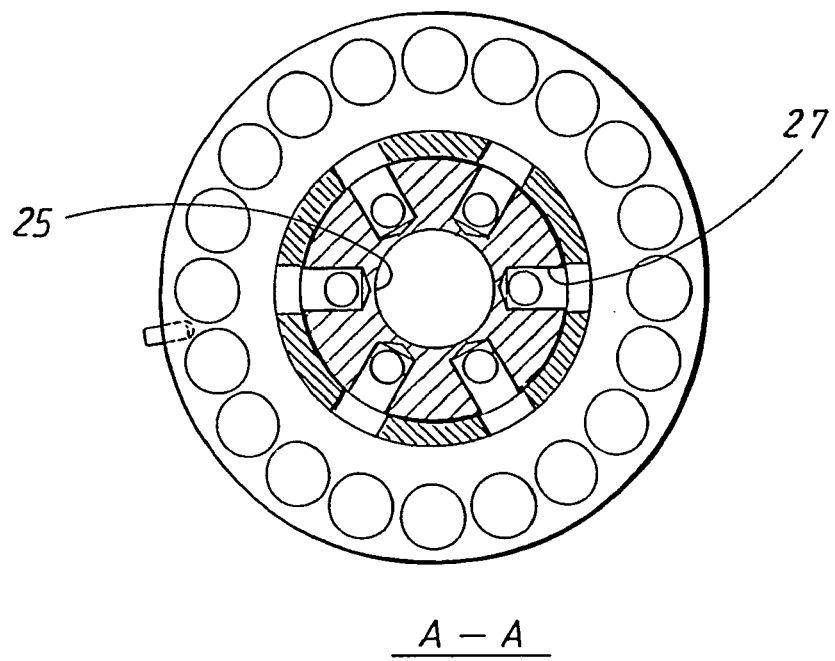
FIG. 4 is a section along the line A—A in FIG. 3.
Figure 5:
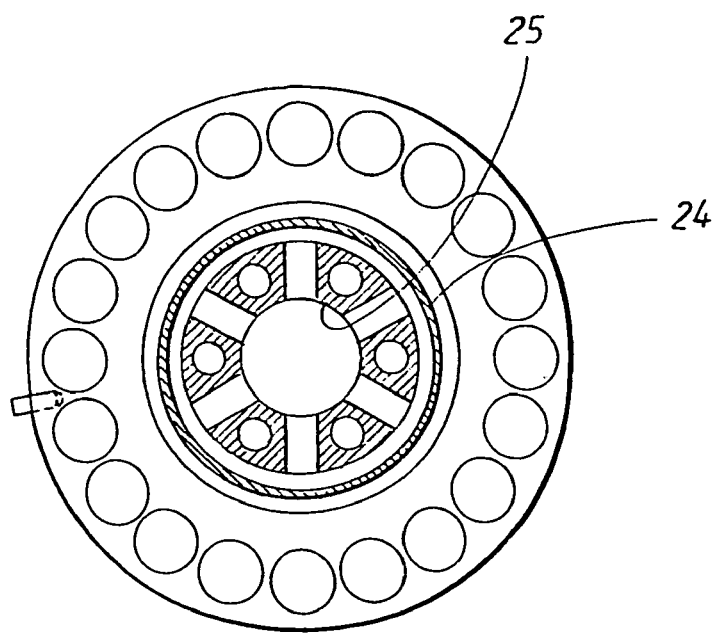
FIG. 5 is a section along the line B—B in FIG. 3.

In FIGS. 4 and 5 there are shown sections through the hot air nozzle along lines A—A and B—B respectively, in FIG. 3.

Figure 6:
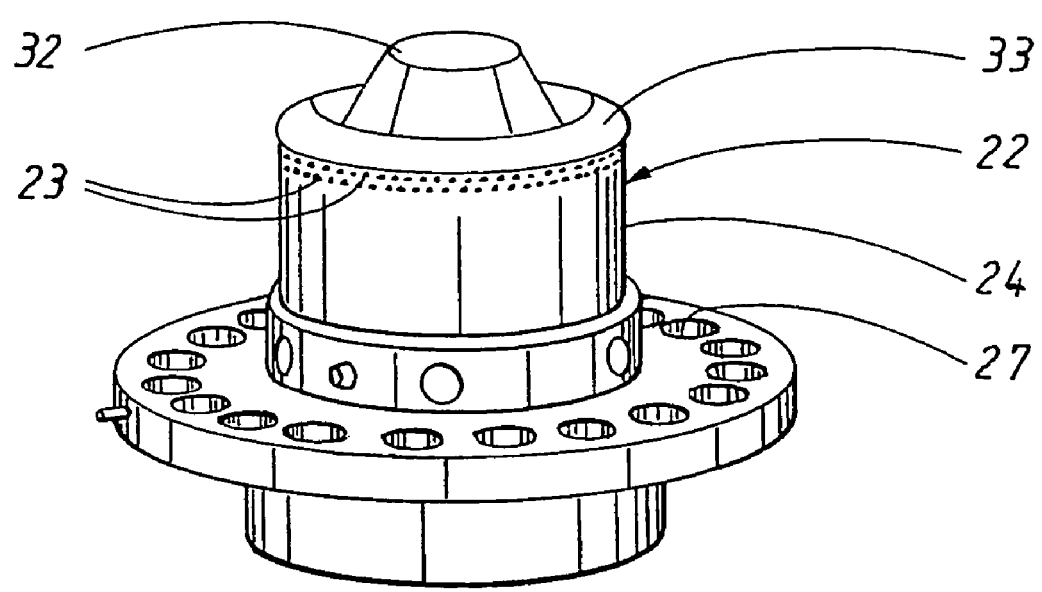
FIG. 6 is a perspective illustration of the hot-gas nozzle in FIG. 3.

FIG. 6 shows a perspective view of the hot-air nozzle made up of two parts which operate with hot air, the peripheral arrangement of outlet openings 23 in the annular part 24 being clearly visible, as are peripherally located outflow ducts 27 and the conical entry end 32 of the circular-cylindrical inner part 28. It can also be seen from FIG. 6 that the annular part 24 is bevelled at its end 33 in order to facilitate introduction into the gap-shaped space between the inner tube and the outer tube.

The invention thus provides a tube-filling machine, and a preferred tube end sealing method for handling double tubes has been described. In the description made with reference to the drawings, the principles underlying the invention are shown on the one hand diagrammatically and on the other hand by specific embodiments of components.

Such components can of course vary in their design within the scope of the accompanying patent claims, and the intention is that the invention is to be limited only by the content of the accompanying patent claims.

What is claimed is:

1. In a tube-filling machine, a method for end sealing of tubes of the kind which has an inner tube surrounded by a gap and an outer tube, both connected to a common tube shoulder which has means for delivering product from the inner tube and the outer tube through an emptying opening, said method comprising feeding said filled tubes individually or alternatively in groups, to an end sealing station working with clamping jaws located along a conveyor path, by a conveyor working stepwise, in the requisite order for processing, the tubes being end sealed in the end sealing station, and the tubes being delivered from the tube-filling machine in a feed-out station, activating the heat-sealable end of a tube for the purpose of sealing the end of a tube filled with product in the following end sealing station working with clamping jaws by introducing an outer annular part (24) provided with outlet openings of a two-part hot air nozzle into the gap between the inner tube and the outer tube, and introducing an essentially cylindrical part with outlet openings of said nozzle into the inner tube, arranging a cooled, centering sleeve around the outer side of the annular part leaving a gap, introducing the outer tube into said gap between the sleeve and annular part, and supplying hot gas through separate passages from said cylindrical part and outer annular part to the inner side of the inner tube end and the inner side of the outer tube end in order to optimize the heat supply of different kinds of material in the inner and outer tubes.

2. Method according to claim 1, wherein said centering sleeve is provided with a cooling duct for direct cooling of the centering sleeve.

3. A tube-filling machine having an arrangement for end sealing of tubes of the kind which has an inner tube surrounded by a gap and an outer tube, both connected to a common tube shoulder which has means for delivering product from the inner tube and the outer tube through an emptying opening, said tubes after filling being fed, individually or alternatively in groups, to an end sealing station working with changing jaws located along a conveyor path, by a stepwise, in the requisite order for processing, the tube(s) being end sealed in the end sealing station, and the tube(s) being delivered from the tube-filling machine in a feed-out station, characterized by an arrangement, in a thermal activation station preceding the end sealing station, and for activating the heat-sealable end of a tube for the purpose of sealing the end of a tube filled with product in the following end sealing station working with clamping jaws, according to the following:

a two-part nozzle (22) for hot gas, preferably hot air, comprising an outer annular part (24) provided with outlet openings (23) and dimensioned to be introduced into the gap between the inner tube and the outer tube, and an essentially cylindrical part (28) with outlet openings (29) dimensioned to be introduced into the inner tube, a, preferably cooled, centring sleeve (30) arranged around the outer side of the annular part (24) leaving a gap for introduction of the outer tube, said outlet openings (23, 29) for hot gas supplying hot gas separately to the inner side of the inner tube end and the inner side of the outer tube end from respective nozzle parts (24, 28) in order to optimize the heat supply, for example in the event of different kinds of material in the inner and outer tubes.

4. Tube-filling machine according to claim 3, characterized in that the centring sleeve (30) is provided with a cooling duct (34) for direct cooling of the centring sleeve.

5. Tube-filling machine according to claim 3, characterized in that the centring sleeve (30) and the annular hot-air nozzle part (24) and also the cylindrical hot-air nozzle part (28) have a conical entry portion.

* * * * *

UNITED STATES PATENT AND TRADEMARK OFFICE
CERTIFICATE OF CORRECTION

PATENT NO.       : 7,021,032 B2
APPLICATION NO.  : 10/498148
DATED            : April 4, 2006
INVENTOR(S)      : Hans Linnér It is certified that error appears in the above-identified patent and that said Letters Patent is hereby corrected as shown below:

On the face of the patent, (57) ABSTRACT, line 8, delete "scaling" and insert therefor --sealing--.
Column 1, line 55, after "method" insert --of--.
Column 1, line 56, after "machine" insert --of--.
Column 3, line 60, after "can" insert --,--.
Column 3, line 60, after "course" insert --,--.
Column 4, line 13, delete "(24)".
Column 4, line 35, after "a" insert --conveyor working--.
Column 4, line 36, "tube(s)" should read --tubes--.
Column 4, line 37, "tube(s)" should read --tubes--.
Column 4, line 38, delete "characterized by an arrangement" and insert therefor --said arrangement comprising--.
Column 4, line 40 delete "and" and insert therefor --apparatus--.
Column 4, line 43, delete "according to the following'"" and insert therefor --said apparatus comprising--.
Column 4, line 44, delete "(22)".
Column 4, line 44, delete ", preferably hot air".
Column 4, line 45, delete "(24)".
Column 4, line 46, delete "(23)".
Column 4, line 48, delete "(28)".
Column 4, line 49, delete "(29)".
Column 4, line 51, delete "preferably".
Column 4, line 51, "centring" should read --centering--.
Column 4, line 51, delete "(30)".
Column 4, line 52, delete "(24)".
Column 4, line 53, delete "(23,".
Column 4, line 54, delete "29) for hot gas".
Column 4, line 56, delete "from respective nozzle parts (24, 28)" and insert therefor --through separate passages from said cylindrical part and outer annular part--.
Column 4, line 57, delete "for example in the event".
Column 4, line 59, delete "Tube" and insert therefor --A tube--.
Column 4, line 59, delete "character-"
Column 4, line 60, delete "ized in that the centring" and insert therefor --wherein said centering--.
Column 4, line 60, delete "(30)".
Column 4, line 61, delete "(34)".
Column 4, line 61, "centring" should read --centering--.
Column 4, line 62, delete "character-"
Column 4, line 63, delete "ized in that the centring" and insert therefor --wherein said centering--.

UNITED STATES PATENT AND TRADEMARK OFFICE
CERTIFICATE OF CORRECTION

PATENT NO. : 7,021,032 B2
APPLICATION NO. : 10/498148
DATED : April 4, 2006
INVENTOR(S) : Hans Linnér It is certified that error appears in the above-identified patent and that said Letters Patent is hereby corrected as shown below:

Column 4, line 63, delete "(30)".
Column 4, line 64, delete "(24)".
Column 4, line 64, delete "also".
Column 4, line 65, delete "(28) have" and insert therefor --has--.

Signed and Sealed this

Twenty-sixth Day of September, 2006

JON W. DUDAS
*Director of the United States Patent and Trademark Office*